(12) United States Patent
Kim et al.

(10) Patent No.: US 11,518,210 B2
(45) Date of Patent: Dec. 6, 2022

(54) INTEGRATED THERMAL MANAGEMENT SYSTEM FOR MOBILITY VEHICLES

(71) Applicants: Hyundai Motor Company, Seoul (KR); Kia Corporation, Seoul (KR)

(72) Inventors: Gwi Taek Kim, Cheonan-si (KR); Woo Suk Jung, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 34 days.

(21) Appl. No.: 17/375,819

(22) Filed: Jul. 14, 2021

(65) Prior Publication Data
US 2022/0194163 A1 Jun. 23, 2022

(30) Foreign Application Priority Data
Dec. 21, 2020 (KR) .................. 10-2020-0179540

(51) Int. Cl.
*F25B 13/00* (2006.01)
*B60H 1/00* (2006.01)

(52) U.S. Cl.
CPC ......... *B60H 1/00278* (2013.01); *B60H 1/004* (2013.01); *B60H 1/00899* (2013.01); *B60H 2001/00307* (2013.01)

(58) Field of Classification Search
CPC ............... B60H 1/00278; B60H 1/004; B60H 1/00899; B60H 2001/00307

USPC ........................................... 62/160
See application file for complete search history.

(56) References Cited

FOREIGN PATENT DOCUMENTS

| CN | 111720222 A | * | 9/2020 |
|---|---|---|---|
| EP | 3511248 A1 | | 1/2019 |
| EP | 3543131 A1 | | 2/2019 |
| JP | 4511061 B2 | * | 7/2010 |
| KR | 10-20212-0019730 A | | 3/2012 |
| KR | 10-2129153 B1 | | 6/2020 |

* cited by examiner

*Primary Examiner* — Davis D Hwu
(74) *Attorney, Agent, or Firm* — Morgan, Lewis & Bockius LLP

(57) ABSTRACT

An integrated thermal management system for mobility vehicles, may include a hybrid compressor including a mechanical compression unit driven using the driving force of an engine, and an electric compression unit driven using the driving force of a motor and configured such that an air blower is connected to the electric compression unit, a refrigerant circulation line fluidically-connected to the hybrid compressor, a condenser and an expansion valve such that a refrigerant circulates thereto, and an indoor air conditioning unit configured to cool or heat air introduced through the air blower and then to discharge the air to the inside of a mobility vehicle and including a cooling core connected to a point of the refrigerant circulation line downstream of the expansion valve of the refrigerant circulation line and a heating core fluidically-connected to an exhaust gas discharge line connected to the engine.

16 Claims, 3 Drawing Sheets

INTEGRATED THERMAL MANAGEMENT SYSTEM FOR MOBILITY VEHICLES

CROSS-REFERENCE TO RELATED APPLICATION

The present application claims priority to Korean Patent Application No. 10-2020-0179540, filed on Dec. 21, 2020, in the Korean Intellectual Property Office, the entire contents of which is incorporated herein for all purposes by this reference.

BACKGROUND OF THE INVENTION

Field of the Invention

The present invention relates to an integrated thermal management system for mobility vehicles, and more particularly to an integrated thermal management system which performs cooling/heating of a passenger compartment, at least an electronic component and a battery of a mobility vehicle using a hybrid compressor.

Description of Related Art

Mobility apparatuses or vehicles refer to all transportation means which carry people or cargo, and are driven by various methods. The most classic method is a method using an internal combustion engine, and recently, on the issue of environmental problems, there are a method using a hybrid engine additionally using a lithium ion battery, a method using only a lithium ion battery, and an environmental method using only a hydrogen fuel cell.

A hybrid mobility vehicle using an internal combustion engine and a battery requires combination of a proper elements to form a cooling system configured to cool the battery and at least an electronic component and to condition air in a passenger compartment.

If circuits are independently configured, not only a compressor for cooling and heating an indoor space and cooling the at least an electronic component but also a compressor for cooling the cooling fluid of the battery are required, and a plurality of independent heat exchangers which may be in contact with ambient air is required, causing problems, such as an increase in the weight of the hybrid mobility vehicle, a decrease in the range of the hybrid mobility vehicle due to the increase in the weight thereof, and a cost increase.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an integrated thermal management system which integrally controls the environment of a hybrid mobility vehicle employing a turbo engine.

In accordance with various aspects of the present invention, the above and other objects can be accomplished by the provision of an integrated thermal management system for mobility vehicles, including a hybrid compressor including a mechanical compression unit driven by driving force of an engine, and an electric compression unit driven by driving force of a motor and configured such that an air blower is connected to the electric compression unit, a refrigerant circulation line fluidically-connected to the hybrid compressor, a condenser and an expansion valve such that a refrigerant circulates thereto, and an indoor air conditioning unit configured to cool or heat air introduced through the air blower and then to discharge the air to inside of a mobility vehicle and including a cooling core connected to a point of the refrigerant circulation line downstream of the expansion valve of the refrigerant circulation line and a heating core fluidically-connected to an exhaust gas discharge line connected to the engine.

The cooling core may include a first evaporator configured to cool air supplied from the air blower to a passenger compartment inside the mobility vehicle, and a second evaporator configured to cool air supplied from the air blower to at least an electronic component inside the mobility vehicle.

An electric heater may be provided in the indoor air conditioning unit, and the electric heater may be operated when a temperature of the heating core is lower than a predetermined value.

The integrated thermal management system may further include a battery provided inside the mobility vehicle to drive the mobility vehicle, a cooling fluid circulation line fluidically-connected to the battery such that a cooling fluid circulates to the battery through a water pump, and a first heat exchanger provided on the cooling fluid circulation line to perform heat exchange between the refrigerant of the refrigerant circulation line and the cooling fluid of the cooling fluid circulation line.

The cooling fluid of the cooling fluid circulation line may pass through the battery and then flow into the first heat exchanger via a first control valve, and the first control valve may be opened depending on a temperature of the cooling fluid.

The integrated thermal management system may further include a second heat exchanger provided on the cooling fluid circulation line to perform heat exchange between the exhaust gas of the exhaust gas discharge line and the cooling fluid of the cooling fluid circulation line, and when a temperature of the battery needs to be increased, the cooling fluid may be heated by the second heat exchanger to increase the temperature of the battery.

A second control valve may be provided on the exhaust gas discharge line, and opening of the second control valve may be controlled when increase of the temperature in the battery is required.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
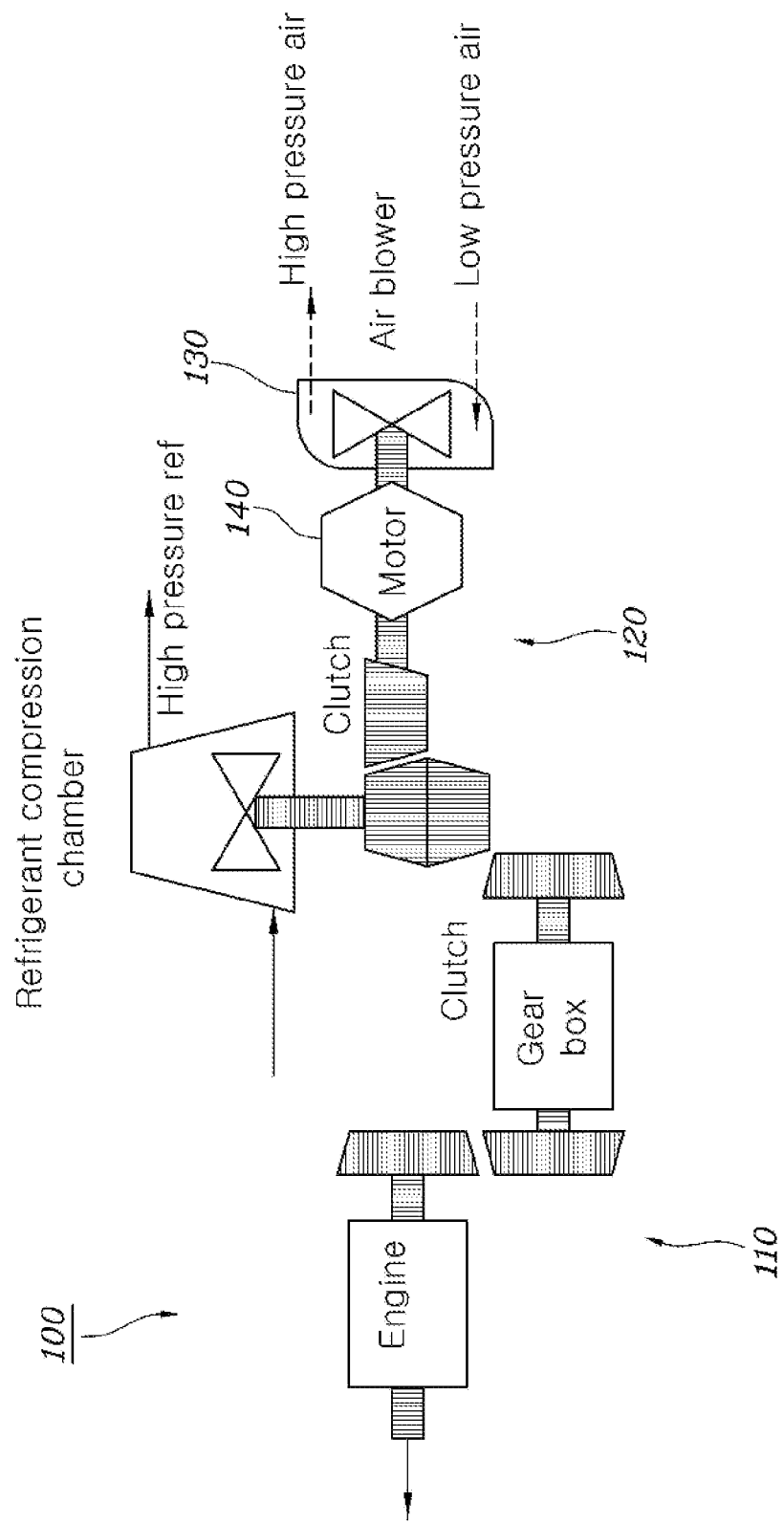
FIG. 1 is a schematic view exemplarily illustrating the configuration of a hybrid compressor according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the present invention rather unclear.

Figure 2:
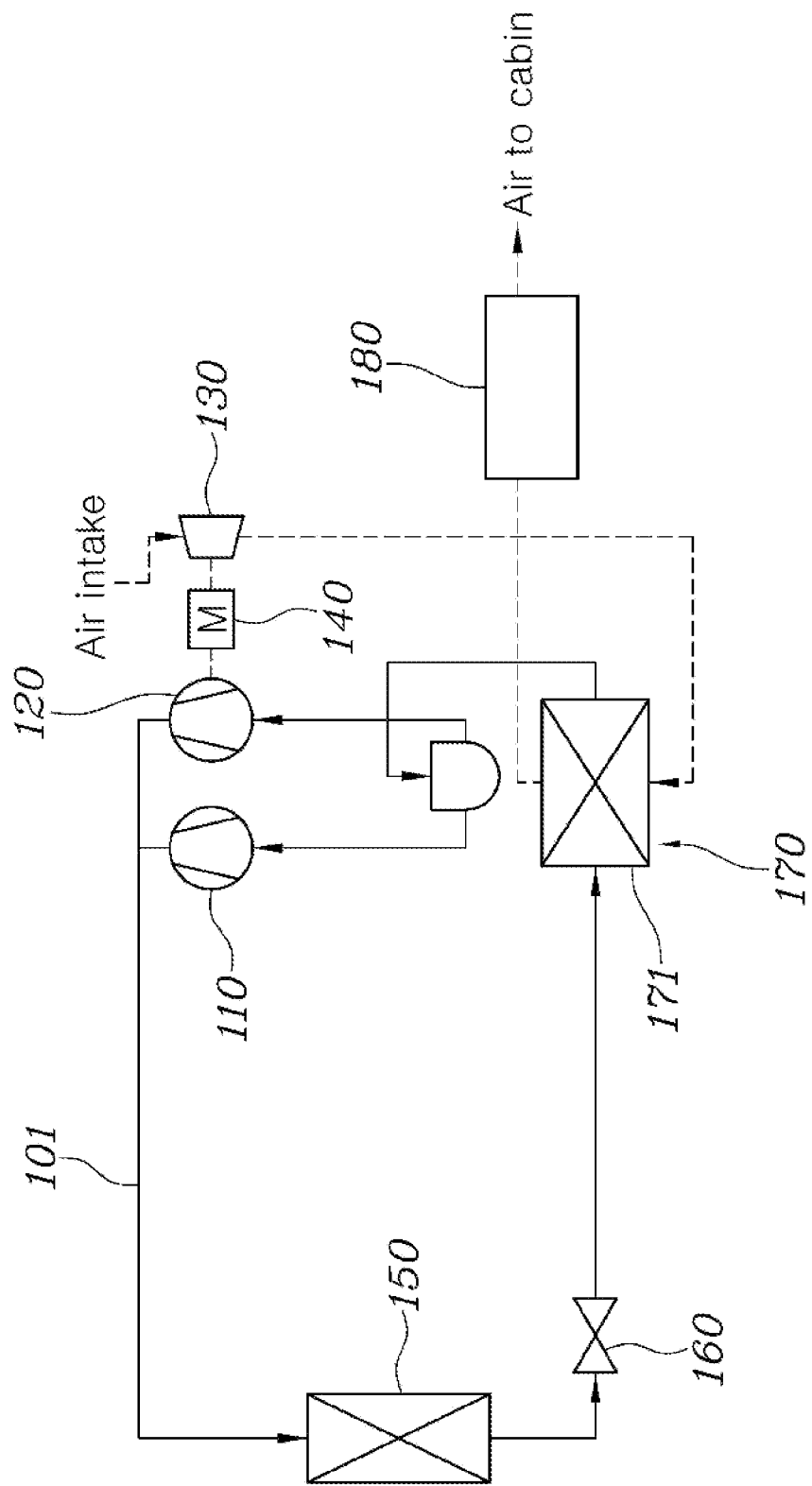
FIG. 2 is a circuit diagram illustrating a refrigerant circulation line and indoor air conditioning to which the hybrid compressor according to various exemplary embodiments of the present invention is applied.
Figure 3:
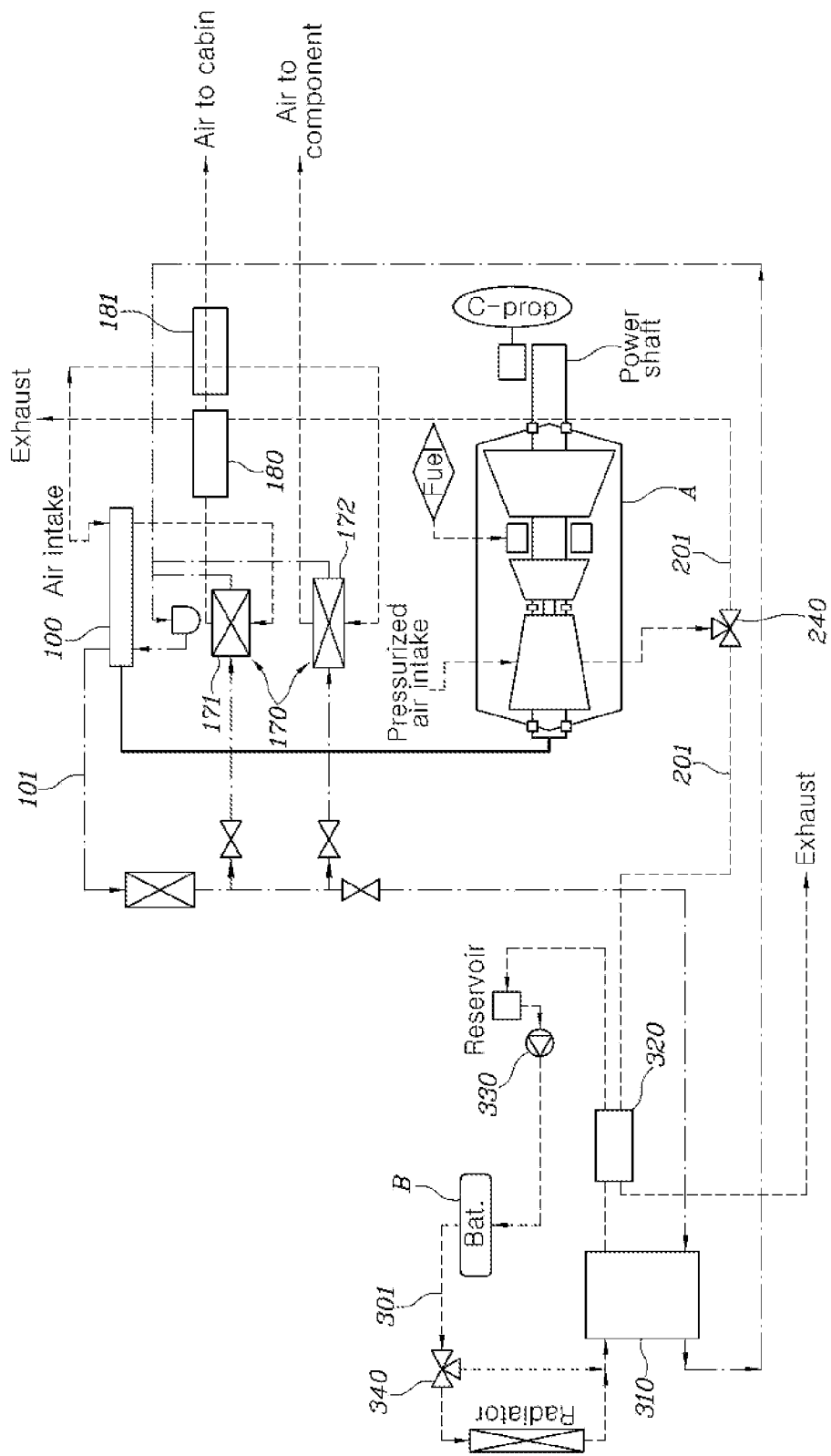
FIG. 3 is a circuit diagram of an integrated thermal management system for mobility vehicles according to various exemplary embodiments of the present invention.

FIG. 1 is a schematic view exemplarily illustrating the configuration of a hybrid compressor according to various exemplary embodiments of the present invention, FIG. 2 is a circuit diagram illustrating a refrigerant circulation line and indoor air conditioning to which the hybrid compressor according to various exemplary embodiments of the present invention is applied, and FIG. 3 is a circuit diagram of an integrated thermal management system for mobility vehicles according to various exemplary embodiments of the present invention.

In order to achieve the above-described objects, an integrated thermal management system for mobility vehicles according to various exemplary embodiments of the present invention includes a hybrid compressor 100 including a mechanical compression unit 110 driven using the driving force of an engine A and an electric compression unit 120 driven using the driving force of a motor 140 and configured such that an air blower 130 is connected to the electric compression unit 120, a refrigerant circulation line 101 connected to the hybrid compressor 100, a condenser 150 and an expansion valve 160 such that a refrigerant circulates thereto, and an indoor air conditioning unit configured to cool or heat air introduced through the air blower 130 and then to discharge the air to the inside of a mobility vehicle and including a cooling core 170 connected to a point downstream of the expansion valve 160 of the refrigerant circulation line 101 and a heating core 180 connected to an exhaust gas discharge line 201 of the engine A.

Referring to FIG. 1 and FIG. 2, FIG. 1 illustrates the detailed configuration of the hybrid compressor 100. The hybrid compressor 100 includes the mechanical compressor 110 driven by receiving the rotation force of a shaft of the engine A, and the electric compressor 120 driven using the driving force of the motor 140. Both the mechanical compressor 110 and the electric compressor 120 are configured to compress the refrigerant in the mobility vehicle. That is, the refrigerant flows along the refrigerant circulation line 101 while repeating compression into a high-temperature and high-pressure state by the hybrid compressor 100, condensation into a low-temperature and high-pressure state through heat dissipation by the condenser 150, and expansion into a low-temperature and low-pressure state by the expansion valve 160.

Here, the motor 140 is connected not only to the hybrid compressor 100 but also to the air blower 130. Referring to FIG. 2, air is also pressurized by the air blower 130 and supplied to the inside of the mobility vehicle, and indoor air of the mobility vehicle may be conditioned through heat exchange between the pressurized air and the refrigerant.

FIG. 3 is a circuit diagram of an integrated thermal management system for mobility vehicles according to various exemplary embodiments of the present invention, and referring to FIG. 3, a control process for conditioning indoor air using waste heat of exhaust gas from the engine A will be described.

Mixing of fuel and intake air, combustion of the mixture, and air exhaust are repeated in the engine A, and high-temperature exhaust gas is generated. Here, when the high-temperature exhaust gas is supplied to the heating core 180 and air pressurized by the air blower 130 is transmitted to the heating core 180, the pressurized air is heated through heat exchange between the exhaust gas and the pressurized air, thus being configured for heating the inside of the mobility vehicle.

Air may be pressurized using the motor 140 to condition indoor air, the refrigerant may be circulated by the hybrid compressor 100 to enable the pressurized air to cool the inside of the mobility vehicle, and if the inside of the mobility vehicle needs to be heated, waste heat of the exhaust gas from the engine A may be used to condition indoor air.

Furthermore, provision of an auxiliary condenser at an indoor side in order to heat the inside of the mobility vehicle is apparent to those skilled in the art.

Parts of the mobility vehicle requiring air-conditioning may be the inside of the mobility vehicle, at least an electronic component, and a battery. If an air conditioning system is installed in each of the above three parts in order to properly perform cooling/heating of these parts, the costs and the weight of the mobility vehicle are increased and thus cause a reduction in the range of the mobility vehicle. Therefore, the integrated thermal management system for mobility vehicles according to various exemplary embodiments of the present invention may minimize the weight and the volume of elements in charge of air-conditioning of the mobility vehicle using the hybrid compressor 100, being configured for facilitating the mobility vehicle to effectively drive. That is, the integrated thermal management system for mobility vehicles according to various exemplary embodiments of the present invention may properly combine waste heat of the exhaust gas generated from the engine A and the circulation system of the refrigerant using the rotation force of the engine A, being configured for controlling the environment of the mobility vehicle.

Furthermore, the cooling core 170 may include a first evaporator 171 configured to cool air supplied from the air blower to a passenger compartment inside the mobility vehicle, and a second evaporator 172 configured to cool air supplied from the air blower to at least an electronic component inside the mobility vehicle.

The first evaporator 171 receives air pressurized by the air blower 130 and performs heat exchange between the pressurized air and the low-temperature refrigerant, being configured for cooling a passenger compartment.

The second evaporator 172 receives the pressurized air and performs heat exchange between the pressurized air and the low-temperature refrigerant, in the same manner as the first evaporator 171, being configured for cooling the at least an electronic component. However, the air supplied to the second evaporator 172 may be supplied by the air blower 130, but because the pressure of air is not very important in terms of cooling of the at least an electronic component, air may be supplied to the second evaporator 172 by a separate line. That is, because only the pressure of ram air is enough, the air supplied to the second evaporator 172 may not be pressurized by the air blower 130.

FIG. 3 illustrates a circuit in which air flowing into the second evaporator 172 cools the at least an electronic component through a separate line.

An electric heater 181 is provided in the indoor air conditioning unit, and the electric heater 181 may be operated when the temperature of the heating core 180 is not sufficiently high, for instance, when the temperature of the heating core 180 is lower than a predetermined value.

Concretely, when the heating core 180 is not configured for sufficiently heating air using only the waste heat of the exhaust gas from the engine A, the electric hater 181 may be operated to additionally perform heating.

Alternatively, when the engine A is not driven, the electric heater 181 alone may heat air pressurized by the air blower 130 to perform heating, and the heated air may be used to humidify the inside of the mobility vehicle.

The integrated thermal management system according to various exemplary embodiments of the present invention may further include a battery B provided inside the mobility vehicle to drive the mobility vehicle, a cooling fluid circulation line 301 connected to the battery 300 such that a cooling fluid circulates to the battery 300 through a water pump 330, and a first heat exchanger 310 provided on the cooling fluid circulation line 301 to perform heat exchange between the refrigerant of the refrigerant circulation line and the cooling fluid of the cooling fluid circulation line.

Concretely, the mobility vehicle may be a hybrid mobility vehicle which may be driven using electric power or be driven by the engine A. When the mobility vehicle is driven using electric power, the battery B is heated and thus the temperature of the battery B is increased, and the increased temperature of the battery B may be prevented. Therefore, the integrated thermal management system according to various exemplary embodiments of the present invention may further include the cooling fluid circulation line 301 in which the cooling fluid configured to circulate to the battery B in order to cool the battery B flows, and the first heat exchanger 310 configured to perform heat exchange between the low-temperature refrigerant and the cooling fluid heated after cooling the battery B, being configured for cooling the battery B.

The cooling fluid of the cooling fluid circulation line 301 may pass through the battery B and then flow into the first heat exchanger 310 via a first control valve 340, and the first control valve 340 may be opened depending on the temperature of the cooling fluid.

Concretely, a radiator may be further provided on the cooling fluid circulation line 301. The radiator is configured to dissipate the heat of the cooling fluid to the outside. That is, the radiator is configured to cool the heated cooling fluid again. Because the refrigerant may not smoothly circulate in the initial stage of starting the mobility vehicle, when it is expected that the battery B is not configured for being smoothly cooled, the heat of the cooling fluid needs to be dissipated through the radiator, and when it is difficult to cool the cooling fluid again using only the refrigerant, the radiator may be subsidiarily used to assist the cooling fluid to dissipate heat.

The opening of the first control valve 340 may be controlled depending on the temperature of the cooling fluid so that the cooling fluid flows as described above.

A second heat exchanger 320 may be further provided on the cooling fluid circulation line 301 to perform heat exchange between the exhaust gas of the exhaust gas discharge line and the cooling fluid of the cooling fluid circulation line, and when the temperature of the battery B needs to be increased, the cooling fluid may be heated by the second heat exchanger 320 to increase the temperature of the battery B.

In order to enable the battery B to be operated in a suitable temperature section, when the temperature of the battery B is low in the initial stage of starting the mobility vehicle, the temperature of the battery B may be increased. Therefore, in the winter in which the temperature is low, in the initial stage of starting the mobility vehicle, high-temperature exhaust gas may be generated by operating the engine A, and the temperature of the battery B may be increased using waste heat of the exhaust gas.

Concretely, the second heat exchanger 320 configured to heat the cooling fluid through heat exchange between the exhaust gas and the cooling fluid may be further provided on the cooling fluid circulation line 301, and when the battery B reaches a temperature at which the battery B is suitably operable, the mobility vehicle may be driven using the battery B.

A second control valve 240 may be further provided on the exhaust gas discharge line 201, and opening of the second control valve 240 may be controlled when the temperature of the battery B needs to be increased. In the initial stage of starting the mobility vehicle in the winter in which the temperature of the battery B needs to be increased, the second control valve 240 may be controlled such that the exhaust gas is transmitted to the second heat exchanger 320. The second control valve 240 may adjust the flow rate of the exhaust gas depending on the extent to which the temperature of the battery B needs to be increased, and may transmit all of the exhaust gas to the battery B to increase the temperature of the battery B in a situation in which the temperature of the battery B needs to be rapidly increased. In a situation in which the temperature of the battery B does not need to be increased, the second control valve 240 enables the exhaust gas to be discharged in a direction other than the second heat exchanger 320.

As is apparent from the above description, an integrated thermal management system for mobility vehicles according to various exemplary embodiments of the present invention may be operated to perform cooling of the inside of the mobility vehicle, cooling of at least an electronic component and cooling of a battery using the power of an engine, and may be operated using a motor to continuously supply ambient air to the inside of the mobility vehicle when the engine is not operated. Furthermore, the integrated thermal management system may use waste heat, generated from the engine, to initially heat the battery and to heat the inside of the mobility vehicle.

In various exemplary embodiments of the present invention, a controller is connected to at least one of the elements of the integrated thermal management system to control the operations thereof.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An integrated thermal management system for a mobility vehicle, the integrated thermal management system comprising:
    a hybrid compressor including a mechanical compression unit driven by driving force of an engine, and an electric compression unit driven by driving force of a motor, wherein an air blower is connected to the electric compression unit;
    a refrigerant circulation line fluidically-connected to the hybrid compressor, a condenser and an expansion valve so that a refrigerant circulates to the refrigerant circulation line; and
    an indoor air conditioning unit configured to cool or heat air introduced through the air blower and then to discharge the air to an inside of the mobility vehicle, and including a cooling core connected to a point of the refrigerant circulation line downstream of the expansion valve of the refrigerant circulation line and a heating core fluidically-connected to an exhaust gas discharge line connected to the engine.

2. The integrated thermal management system of claim 1, wherein the cooling core includes a first evaporator fluidically-connected to the refrigerant circulation line and fluidically-connected to the air blower to receive the air pressurized by the air blower and configured to perform heat exchange between the pressurized air and the refrigerant of the refrigerant circulation line, for cooling a passenger compartment of the mobility vehicle.

3. The integrated thermal management system of claim 2, wherein the heating core is fluidically-connected to the first evaporator.

4. The integrated thermal management system of claim 3, wherein an electric heater is fluidically-connected to the heating core, and the electric heater is configured to be operated when a temperature of the heating core is lower than a predetermined value.

5. The integrated thermal management system of claim 2, wherein an electric heater is fluidically-connected to the first evaporator, and the electric heater is configured to be operated when a temperature of the heating core is lower than a predetermined value.

6. The integrated thermal management system of claim 1, wherein the cooling core includes a second evaporator fluidically-connected to the refrigerant circulation line and configured to cool the air supplied from the air blower to at least an electronic component inside the mobility vehicle, by performing heat exchange between the air and the refrigerant of the refrigerant circulation line.

7. The integrated thermal management system of claim 1, wherein an electric heater is provided in the indoor air conditioning unit, and the electric heater is configured to be operated when a temperature of the heating core is lower than a predetermined value.

8. The integrated thermal management system of claim 1, further including:
    a battery provided inside the mobility vehicle to drive the mobility vehicle;
    a cooling fluid circulation line fluidically-connected to the battery so that a cooling fluid circulates to the battery through the cooling fluid circulation line by a pump; and
    a first heat exchanger provided on the cooling fluid circulation line and fluidically-connected to the refrigerant circulation line to perform heat exchange between the refrigerant of the refrigerant circulation line and the cooling fluid of the cooling fluid circulation line.

9. The integrated thermal management system of claim 8, wherein the cooling fluid of the cooling fluid circulation line passes through the battery and then flows into the first heat exchanger via a first control valve, and the first control valve is configured to be opened according to a temperature of the cooling fluid.

10. The integrated thermal management system of claim 9, wherein a radiator is mounted in the cooling fluid circulation line and the first control valve is configured to control a flow of the cooling fluid to selectively bypass the radiator.

11. The integrated thermal management system of claim 8, further including:
    a second heat exchanger provided on the cooling fluid circulation line and fluidically-connected to the exhaust gas discharge line to perform heat exchange between an exhaust gas of the exhaust gas discharge line and the cooling fluid of the cooling fluid circulation line,
    wherein, when a temperature of the battery needs to be increased, the cooling fluid is heated by the second heat exchanger to increase the temperature of the battery.

12. The integrated thermal management system of claim 11, wherein the cooling fluid circulation line connects the battery, the first heat exchanger, the second heat exchanger and the pump in a closed loop.

13. The integrated thermal management system of claim 11, wherein a second control valve is provided on the exhaust gas discharge line, and opening of the second control valve is controlled when increase of the temperature in the battery is required.

14. The integrated thermal management system of claim 13, wherein the second control valve is provided on the exhaust gas discharge line between the second heat exchanger and the engine.

15. The integrated thermal management system of claim 1, wherein the motor is mounted between the electric compression unit and the air blower and the electric compression unit and the air blower are operated by the driving force of the motor.

16. The integrated thermal management system of claim 1, wherein the mechanical compression unit and the electric compression unit are fluidically-connected to the refrigerant circulation line in parallel and the condenser and the expansion valve are fluidically-connected to the refrigerant circulation line in series.

* * * * *